US010701584B2

(12) United States Patent
Engelen

(10) Patent No.: US 10,701,584 B2
(45) Date of Patent: Jun. 30, 2020

(54) METHOD FOR AVOIDING CONGESTION IN A DATA NETWORK WITH TRANSMITTING DEVICES SUCH AS MODEMS COMMUNICATING WITH SATELLITES BY STATISTICALLY MODIFYING THE TRANSMISSION SLOT OF THE DEVICES

(71) Applicant: Hiber B.V., Amsterdam (NL)

(72) Inventor: Maarten Johannes Engelen, Amsterdam (NL)

(73) Assignee: Hiber B.V., Amsterdam (NL)

( * ) Notice: Subject to any disclaimer, the term of this patent is extended or adjusted under 35 U.S.C. 154(b) by 0 days.

(21) Appl. No.: 15/982,231

(22) Filed: May 17, 2018

(65) Prior Publication Data

US 2019/0261215 A1    Aug. 22, 2019

(30) Foreign Application Priority Data

Feb. 18, 2018   (NL) .................................... 2020452

(51) Int. Cl.
| | | |
|---|---|---|
| H04L 12/28 | (2006.01) | |
| H04W 28/02 | (2009.01) | |
| H04B 7/185 | (2006.01) | |
| H04W 28/12 | (2009.01) | |
| H04W 74/08 | (2009.01) | |
| H04B 7/212 | (2006.01) | |

(52) U.S. Cl.
CPC .... *H04W 28/0289* (2013.01); *H04B 7/18513* (2013.01); *H04B 7/18543* (2013.01); *H04B 7/18584* (2013.01); *H04B 7/2125* (2013.01); *H04W 28/0268* (2013.01); *H04W 28/12* (2013.01); *H04W 74/08* (2013.01); *H04B 7/18586* (2013.01)

(58) Field of Classification Search
CPC ....................................................... H04L 12/50
USPC ............................................................ 370/400
See application file for complete search history.

(56) References Cited

U.S. PATENT DOCUMENTS

| | | | |
|---|---|---|---|
| 5,644,572 A | 7/1997 | Olds | |
| 5,659,545 A | 8/1997 | Sowles | |
| 6,625,118 B1 | 9/2003 | Hadi Salim et al. | |
| 7,606,188 B2 | 10/2009 | Dale et al. | |
| 7,650,379 B2 | 1/2010 | Hart et al. | |
| 8,792,517 B2 * | 7/2014 | Mo | H04W 74/006 370/445 |
| 9,763,253 B2 | 9/2017 | Grant et al. | |
| 2002/0177460 A1 * | 11/2002 | Beasley | H04B 7/2662 455/502 |

(Continued)

FOREIGN PATENT DOCUMENTS

| | | |
|---|---|---|
| EP | 2104983 A2 | 9/2009 |
| WO | 02/05457 A1 | 1/2002 |

*Primary Examiner* — Dang T Ton
(74) *Attorney, Agent, or Firm* — Jordan IP Law, LLC; Todd A. Vaughn

(57) ABSTRACT

A method for transmitting data from a population of devices to a relay station travelling with respect to one another. For transmitting the data to the relay station, each device includes at least one transmission slot resulting from a channel access method and a transmission window within which the relay station is to travel. The relay station is to broadcast an instruction to the population of devices before the data transmission, and, upon receiving the instruction, at least part of the population of devices is to set a modified transmission slot.

11 Claims, 5 Drawing Sheets

(56) References Cited

U.S. PATENT DOCUMENTS

2002/0187749 A1\* 12/2002 Beasley ............... H04B 7/2662
　　　　　　　　　　　　　　　　　　　　　　455/41.1
2003/0032391 A1　　2/2003 Schweinhart
2015/0270890 A1　　9/2015 Vasavada \* cited by examiner

METHOD FOR AVOIDING CONGESTION IN A DATA NETWORK WITH TRANSMITTING DEVICES SUCH AS MODEMS COMMUNICATING WITH SATELLITES BY STATISTICALLY MODIFYING THE TRANSMISSION SLOT OF THE DEVICES

CROSS-REFERENCE TO RELATED APPLICATIONS

The present application claims priority under 35 U.S.C. § 119 to Dutch Patent Application No. NL 2020452 (filed on Feb. 18, 2018), which is hereby incorporated by reference in its complete entirety.

TECHNICAL FIELD

Embodiments of the invention relate to a method for managing a population of devices transmitting data to a relay station in order to optimize the network occupation and data transmission.

BACKGROUND

Satellites are orbiting around the world gathering data, via data connections, from a growing number of devices (such as modems) on earth. Every satellite is limited in regard the number of data connections it can handle concurrently. Therefore, when a satellite passes an area with a lot of devices in its footprint, and each of these devices tries to setup a data connection to the satellite, congestion problems occur when the number of data connections exceeds the number of data connections the satellite can handle. More in general congestion problems occur when too many devices in a network try to connect to a relay station at more or less the same time.

U.S. Pat. No. 9,763,253, according to its abstract, describes "Methods and systems are described which provide solutions for determining how to allocate terminals to slots in order to maximize communication system performance in the case where there is no feedback channel between a multiuser satellite receiver and terminals within the field of view. Terminals operate independently of each other and choose transmission slots based upon the geographic position of the terminal. Terminals can be programmed with a slot selector to choose slots according to some deterministic or non-deterministic function of the current position. A slot plan database may be used to assist in efficient slot selection. Regular and irregular grid based allocation methods are described, that reduce the likelihood that too many terminals transmit using the same slot within the field of view. Satellite induced Doppler effects can be utilized be further increase slot re-use and to improve allocation of slots so that the receiver sees an approximately uniform distribution of frequencies over the frequency band to improve system throughput. The approaches described herein greatly reduce or eliminate the probability of failure at the receiver, which has numerous implementation advantages such as reduced cost, complexity, and power consumption."

U.S. Pat. No. 7,650,379, according to its abstract, describes "A method for managing data traffic in a multi-user multiple-simultaneous-access (MUMSA) environment, for example in a code reuse multiple access (CRMA) environment or other physical environment having true random access with more than one transmission present at the same time, the method including estimating channel load for multiple users, then using the estimate of channel load to calculate a congestion threshold on an ongoing basis, at each terminal performing an experiment using that congestion threshold value and a random number generator to determine if a packet is eligible to be transmitted, transferring downstream virtual channel traffic and redistributing user terminals to affiliate with the proper downstream virtual channel."

U.S. Pat. No. 7,606,188, according to its abstract, describes "Monitoring the world is due to the availability of a wide variety of sensors a rapidly growing market. The data from sensors is transmitted over networks and gathered to deduct valuable information.

Satellite communications are carried out using the Data Over Cable Interface Specification (DOCSIS). Satellite modems are notified of upstream channel congestion by inserting a congestion notification message in a medium access protocol (MAP) message for the upstream channel. Specifically, the congestion notification message is inserted in an unused field of the MAP message, such as the explicit congestion notification (ECN) field. The MAP message can also carry other characteristics of the upstream channel, including priority threshold, multicast access burst availability, and available bandwidth."

U.S. Pat. No. 6,625,118, according to its abstract, describes "In a packet network, on receiving a packet a receiving host determines if the packet has been marked by any of the nodes through which it passed, to indicate congestion at that node, e.g. by checking the CE bit in an IP header. A packet flow control parameter is generated at the receiving side, and sent to the source using an Internet Protocol, as part of the packet acknowledgment, to control the flow of packets from the source, according to the packet flow control parameter. This can reduce control loop delays caused by waiting at the source for a number of acknowledgments to arrive before the congestion level can be calculated. Conditions at the receiver which may be different to those at the source can now be taken into account in the flow control."

SUMMARY

The invention provides the management of a network with a population of devices transmitting data to a relay station in order to optimize the network occupation and data transmission. Congestion problems in the network are being avoided or when they occur, they are being solved. As a result, power consumption of the devices is reduced. Therefore, the invention provides a better Quality of Service (QoS) within the network.

To that end, the invention provides a method for transmitting data from a population of devices to a relay station travelling with respect to one another, wherein for transmitting said data to said relay station each device comprises a transmission window and at least one transmission slot resulting from a channel access method, wherein said relay station is travelling within said transmission windows, and wherein said relay station broadcasts an instruction to said population of devices before said data transmission, wherein upon receiving said instruction at least part of said population of devices sets a modified transmission slot.

There are basically three principle channel access methods to share a band or frequency spectrum. There is CDMA (Code Division Multiple Access), FDMA (Frequency Division Multiple Access) and TDMA (Time Division Multiple Access). CDMA uses both time and frequency and 'stacks' signals on top of each other where every signal is recognizable with a certain scrambling and/or spreading code. For random access systems, this is the most useful channel access method. Though, when time splitting between broadcasts is done this could get an improved performance. For example, when the first time window X has time divided slots and the second window Y has full random access, the two methods can be combined to create a more efficient use of spectrum. Of course, the first window X does not need to use CDMA with fixed time slots, so when starting to time split transmission windows changing channel access methods and protocols can be either more efficient for fixed slots (of any kind) or random access to maximize channel throughput when modems have shown to be predictable users of the network. Other well-known channel access methods include OFDMA (Orthogonal Frequency Division Multiple Access), SDMA (Spatial Division Multiple Access) and PDMA (Polarization Division Multiple Access). Further channel access methods do exist. The invention use any channel access method.

A transmission window of a device is a window of time wherein a transmission of a device can be received by a relay station.

In this respect, travelling relates to going from a first position to a second position. This is also referred to as displacing, i.e., going from one place or location to another. In particular, the device, the relay station, or both follow a trajectory. Such a trajectory may be periodic. In an embodiment, the relay station is in an orbit around for instance the earth, the moon, or another celestial body. The device, population of devices, and/or the relay station may go along, or follow, a track or path.

The modified transmission slot can for instance result in that one or more of the devices will not transmit their data to the relay station at the current opportunity, but will wait for a next in case the relay station passes frequently or at regular time intervals. It may also mean that devices will wait for a next of another, similar relay station to pass the transmission window or when they receive a broadcast from such other, similar relay station.

The devices are also referred to as modems or other communication devices.

The relay station is referred to as a satellite, a drone or any other vehicle.

In an embodiment, devices or modems in a population do not need a control channel through which a satellite as relay station can inform the population of modems when to send in order to avoid overlapping signals. As such, the modems can randomize their transmission over a time window during the pass of a satellite. They will prefer sending when the satellite is in an optimal distance and elevation angle to the modem. When the density of modems in an area goes up, it could be that there are too many signals at the same time to allow for reception of all these signals. The satellite will inform the ground systems that it was not able to receive messages during a certain time because of congestion. By modeling the density in an area and simulating sending scenarios, the transmission slot of the modems can be optimized to be within a time in seconds of a required service level of a modem. The device (or modem) service level can comprises the time interval for sending updates, from gathered data, to a satellite or relay station; for example, once a day, or 3 times a week or once a month. By subsequently sending broadcast messages or instructions, when the satellite is over that area, the modems can be reconfigured to randomize transmission over a longer/shorter slot to get a statistically optimal network occupation and data transmission. In another embodiment by sending further broadcast messages or instructions targeting a specific modem, when the satellite is over that area, the specific modem can be reconfigured to transmit over a longer/shorter slot to get a specific network occupation and data transmission.

Gathered data can include information for such as tracking of powered and unpowered assets, such as the position of fishing vessels, railcars, trailers, machines or assets that cannot move by themselves but of which the location is often lost or unknown, such as large equipment, mobile toilets, etc. Also, monitoring of external conditions such as in smart agriculture, where soil status is measured for yield optimization, or climate stations. Terrestrial networks are often not available and can take a long time to create. Due to the introduction of low cost satellites and especially low earth orbit satellites, satellite networks become more and more popular to distribute data over the earth. A trend not only for rural areas, where terrestrial networks are unavailable, but also for other areas where there is a need for a quick and easy way to provide data distribution. In particular, sensor data is suited for distribution by low cost satellite networks with limited bandwidth, since, in general, this kind of data comprises relatively small data packages. In addition sensor data updates often don't need to be sent every minute, and can be sent every few hours, for example to track a vehicle or even once per year, for example to track the position of a coastline. There are also sensors that have a notification function and only need to transmit data when an event occurs, for example when the content of a tank drops below a threshold. Satellites are objects orbiting celestial bodies, such as the earth.

In an embodiment, the channel access method is selected from the group of FDMA, TDMA, CDMA, OFDMA, SDMA, PDMA or a combination thereof.

In an embodiment, the instruction causes a division of said population of devices into at least two groups of devices. In an embodiment, at least one group has a modified transmission slot for transmitting said data to said relay station.

In an embodiment, the broadcast comprises a broadcast transmission window defining a footprint of said relay station.

In an embodiment, the population of devices is positioned within said footprint during said broadcast.

In an embodiment, at least a number of said devices of said population of devices each initiate a data connection to said relay station resulting in a congestion that causes failing of at least part of said data connections to said relay station.

In an embodiment, the relay station has a data receiving capacity and said failing comprises said data receiving capacity being not enough to receive said data transmission from said population of devices.

In an embodiment, the setting of said modified transmission slot comprises interrupting a transmission slot.

In an embodiment, the channel access method is TDMA and the setting of said modified transmission slot comprises at least one selected from replacing an actual device position for a virtual device position, modifying a transmission slot length, modifying a transmission slot start, modifying a transmission slot end, interrupting a transmission slot and a combination thereof.

An actual device position corresponds with the position, or the coordinates (latitude/longitude), where a device is actually located on earth or on a celestial body.

A virtual device position corresponds with the position, or the coordinates (latitude/longitude), where a device is virtually located on earth or a celestial body in order to set its modified transmission slot. The coordinates of a virtual device position do not have to correspond with that of an actual device position.

In an embodiment, the relay station has a data receiving capacity, and said modified transmission slot is set for statistically distributing said data transmission of said population of devices for matching said data receiving capacity.

In an embodiment, the setting of said modified transmission slot is derived from simulating transmission scenarios using a density model of said population of devices. Such a model and calculation may be done remotely from said relay station and/or said population of devices. In an embodiment, remote server or server system runs said model and provide results to a relay station.

In an embodiment, at least part of said devices of said population of devices each comprises a device service level defining a time interval for transmitting data. Such a device service level may for instance define at which intervals in time a device can send data. For instance, a device may send daily, weekly, or monthly, based upon this service level. Within such a time interval, a device may thus look for an opportunity to transmit its data to relay station.

In an embodiment, the relay station broadcasts a further instruction or modified transmission slot to said population of devices before said data transmission, wherein upon receiving said instruction at least one device of said population of devices sets a further modified transmission slot.

In an embodiment, the relay station is a satellite orbiting a celestial body.

In an embodiment, the devices comprise at least one sensor providing measurement data, and a data transmitter for transmitting said data to said relay station remote from said device, wherein said data comprises said measurement data.

The invention further relates to a system comprising a relay station and a population of devices for transmitting data to said at least one relay station, said relay station and said population of devices travelling with respect to one another, wherein each device of said population of devices has a transmission window and at least one transmission slot resulting from a channel access method for transmitting said data to said relay station, wherein said relay station is adapted for broadcasting an instruction to said population of devices when it travels within said transmission windows and before said data transmission, wherein said devices of said population of devices are adapted for setting a modified transmission slot in response to said instruction.

The invention further relates to a device for transmitting data to a remote relay station, said device comprising a data processor and software which, when running on said data processor, comprises a transmission window and a transmission slot setting, receives a broadcast instruction from said relay station, modifies said transmission slot for providing a modified transmission slot, and transmits said data to said relay station in said modified transmission slot.

The invention further relates to a data acquisition system comprising a relay station, a server and at least one device as described above. In this embodiment, the at least one device and said relay station travel with respect to one another and said relay station transmits data received from said at least one device to said server.

In an embodiment, of the data acquisition system the relay station travels with respect to said server.

In an embodiment of the data acquisition system, it comprises a population of said devices, wherein said devices in said population of devices are functionally stationary with respect to one another.

As mentioned, the device can comprise a sensor or can for instance comprise a camera, sensors for climate conditions like humidity, temperature, light level, carbon dioxide, other gasses, air pressure, but also for physical parameters like conductivity, for organic entities like bacteria and viruses, for composition of liquid chemical compounds.

The invention further pertains to a computer program product for controlling a device that forms part of a population of devices for transmitting data to a relay station, said device and said relay station travelling with respect to one another, said computer program product:
  retrieving displacement data regarding said travelling of said device and said relay station with respect to one another;
  determining a transmission window from said displacement data;
  comprising at least one transmission slot resulting from a channel access method for transmitting said data;
  retrieving a broadcast instruction from said relay station to said devices before said data transmission;
  upon receiving said instruction sets a modified transmission slot, and
  transmit said data to said relay station or another, similar relay station in said modified transmission slot.

The invention further pertains to a computer program product for controlling a relay station for receiving data transmitted by a population of devices, said population of device and said relay station travelling with respect to one another, and said computer program product:
  broadcasts an instruction to said population of devices before said data transmission, said instruction adapted for instructing at least part of said population of devices to set a modified transmission slot, and
  receives said data transmitted by said population of devices.

The invention further pertains to a method for transmitting data from a population of devices to a relay station travelling with respect to one another, wherein each device comprises a transmission window and at least one transmission slot, for transmitting said data to said relay station, wherein said relay station is travelling within said transmission windows, and wherein said relay station broadcasts an instruction to said population of devices before said data transmission, wherein upon receiving said instruction at least part of said population of devices sets a modified transmission slot.

The term "statistically" when used herein, relates to dealing with the collection, analysis, interpretation, presentation, and organization of data. In particular, it comprises modeling behavior of a population. Using probability distributions, a probability of optimizing transmission reliability is calculated and predicted.

The term "substantially" when used herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

DRAWINGS

Embodiments of the invention will now be described, by way of example only, with reference to the accompanying schematic drawings (which are not necessarily on scale) in which corresponding reference symbols indicate corresponding parts, and in which.

DESCRIPTION

The current drawings relate to an embodiment where devices are positioned on the earth and one or more relay stations circling the earth. Other similar embodiments can be thought of. A device does not need to be stationary. Many devices can be deployed in an area. The relay station can for instance comprise any vehicle, including a drone. These relay stations can have a trajectory that pass the device frequently, for instance with regular time intervals.

Figure 1:
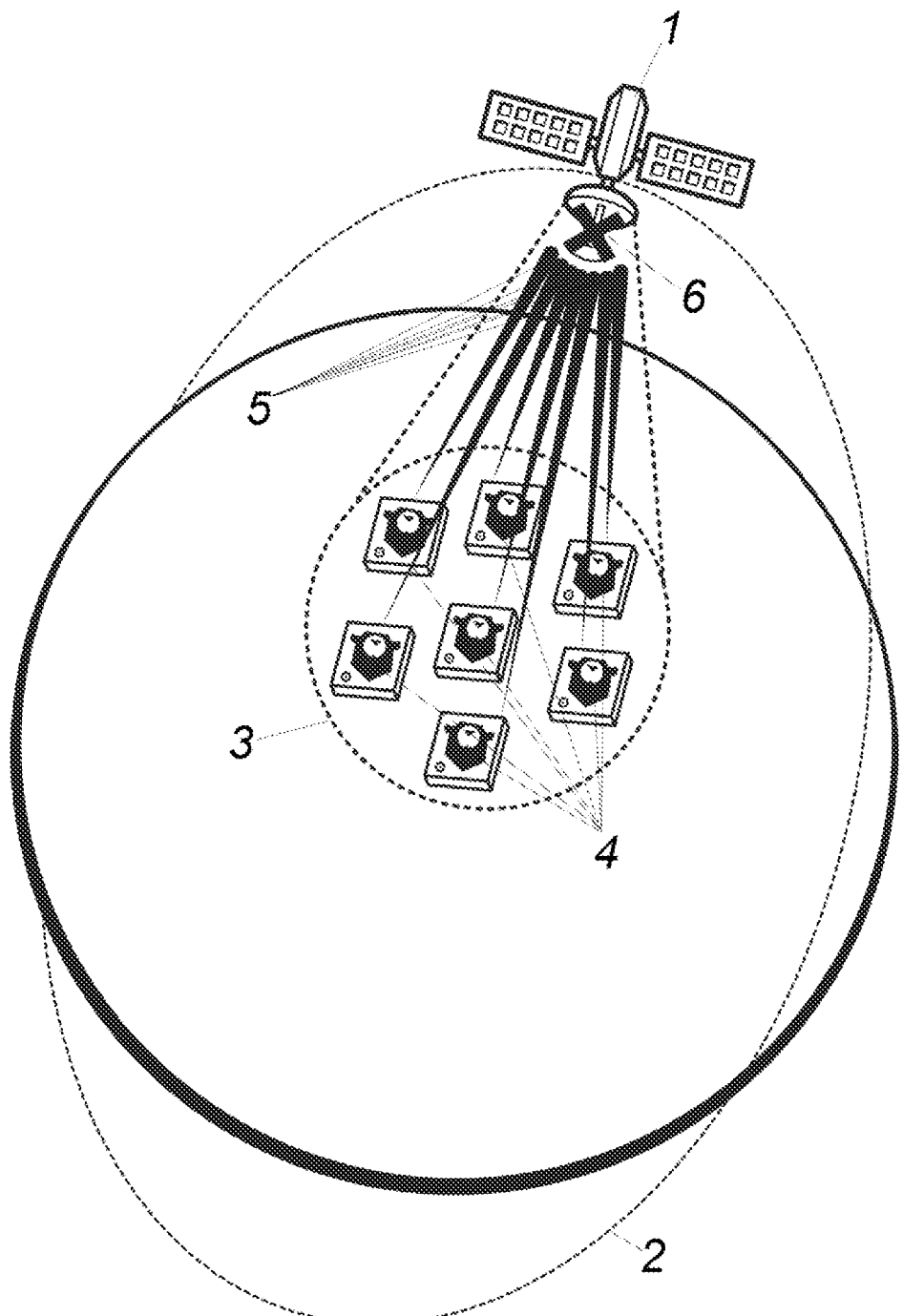
FIG. 1 illustrates a population of modems and a congestion problem.

FIG. 1 illustrates a satellite 1 in an orbit 2 and with a footprint 3. Within said footprint 3 there are seven modems 4 trying to initiate a connection 5. Since the receiving capacity of satellite 1 is not enough to handle all connections 5, a connection failure 6 results since the modems 4 fail to connect to satellite 1.

Figure 2:
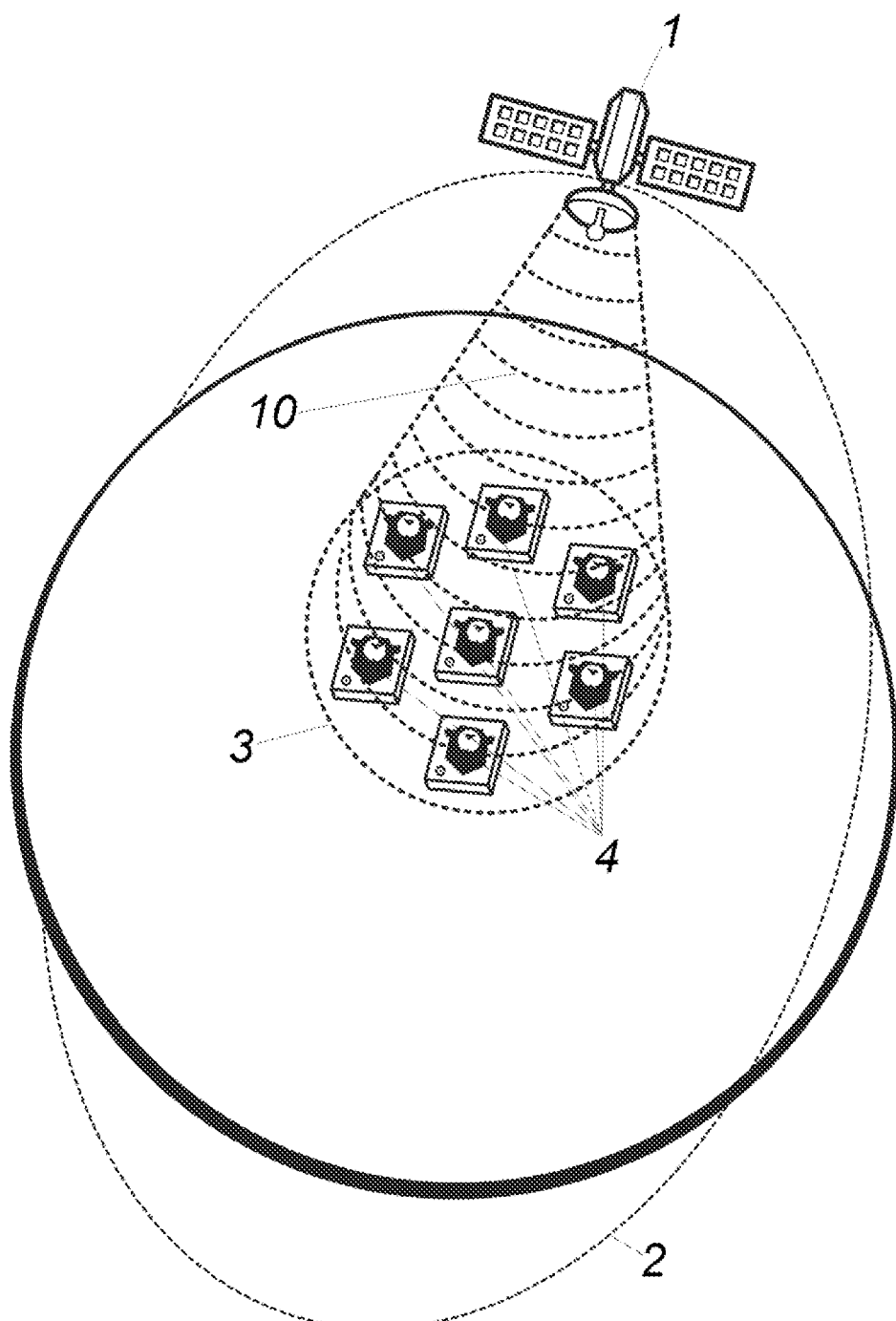
FIG. 2 illustrates a satellite broadcasting an instruction to a population of modems within its footprint in order to limit the number of concurrent connections.

FIG. 2 illustrates a satellite 1 in an orbit 2 and with a footprint 3. Satellite 1 broadcasts an instruction 10 to all modems 4 within its footprint 3. The instruction 10 is received and processed by all modems 4.

Figure 3:
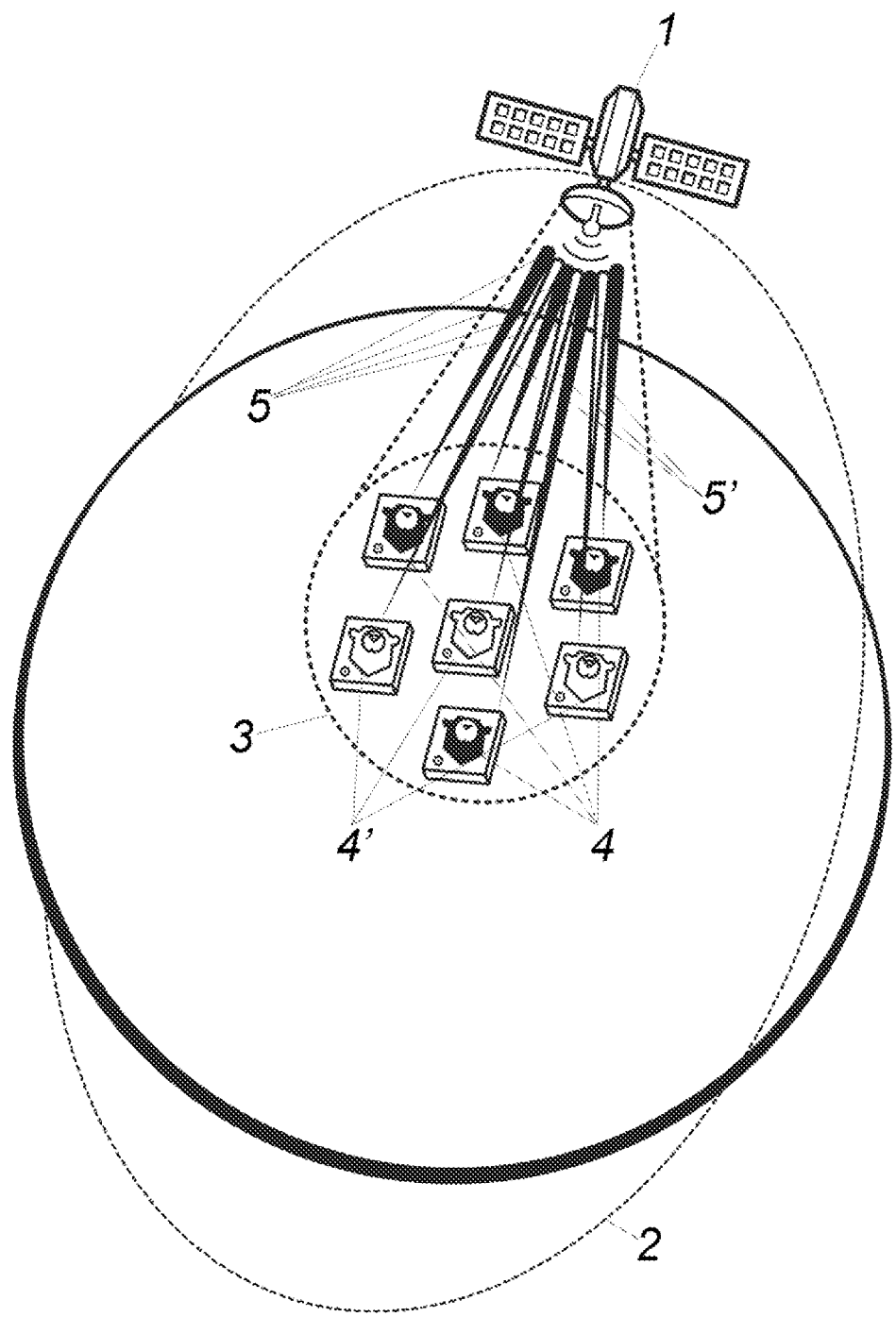
FIG. 3 illustrates a division of connected modems after an instruction from a satellite.

FIG. 3 illustrates a situation after satellite 1 has broadcast an instruction 10 (See, FIG. 2) to all modems 4, 4' within its footprint 3 in order to limit the number of concurrent connections (See, FIG. 1 connections 5) and to prevent these connections to fail. Now, due to the instruction, not all modems 4, 4' try to connect to satellite 1. First modems 4 set up a connection 5 to satellite 1 (depicted by a solid connection line). After the data transmission of modems 4, modems 4' set up a connection 5' for data transmission (depicted by an outlined connection line).

Figure 4:
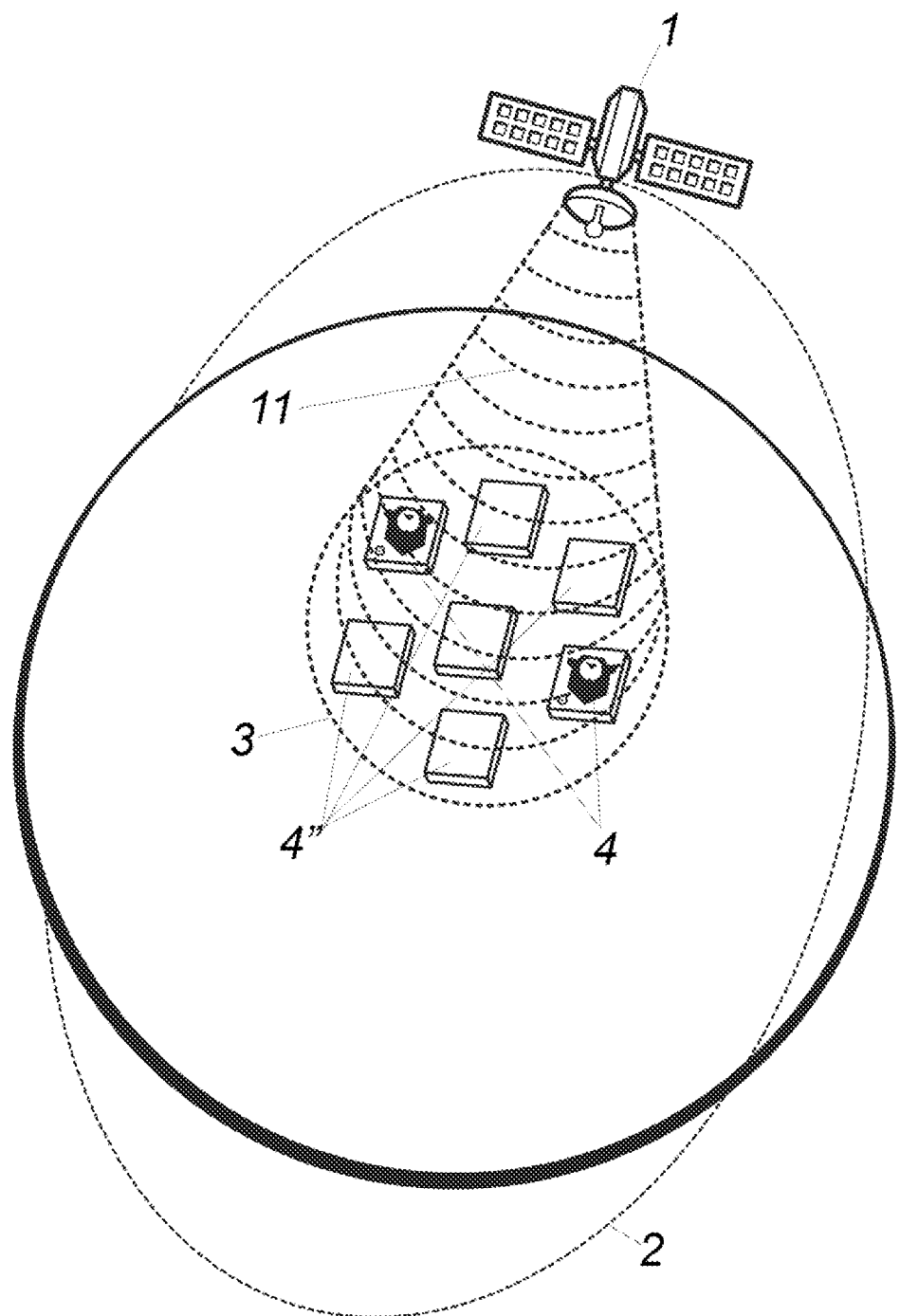
FIG. 4 illustrates a satellite broadcasting an instruction to a part of a population of modems within its footprint.

FIG. 4 illustrates a satellite 1 in an orbit 2 and with a footprint 3. Satellite 1 broadcasts another instruction 11 to all modems 4, 4" within its footprint 3. The instruction 11 can be received by all modems 4, 4" but only the two modems 4 process the instruction since the instruction 11 has been labeled to be processed only by these modems 4. The instruction 11 can be a further instruction after instruction 10 (See, FIG. 1). Instruction 11 further optimizes the network occupation through fine-tuning the two modems 4, depicted with a head of a bear.

Figure 5:
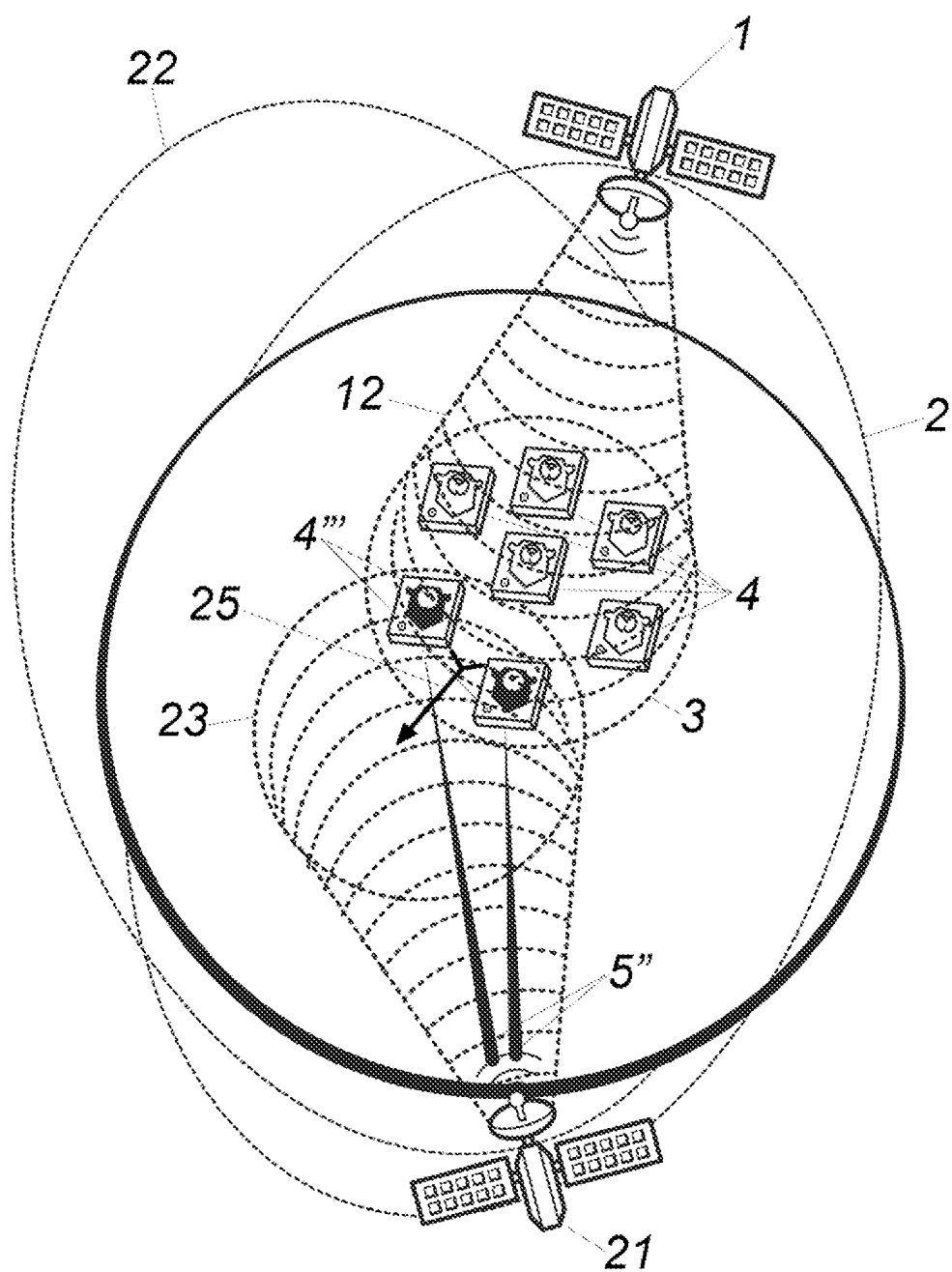
FIG. 5 illustrates a population modems wherein two modems are within the footprint of two satellites.

FIG. 5 illustrates a satellite 1 in an orbit 2 and with a footprint 3 and a satellite 21 in an orbit 22 and with a footprint 23. The modems 4, 4''' are within footprint 3. The modems 4''' are also within footprint 23. Due to the broadcast by satellite 1 of a further instruction 12, the modems 4''' set a modified transmission slot based upon a virtual device position which virtually displace and a TDMA channel access method, depicted by arrow 25, the modems 4''' towards the center of footprint 23 of satellite 21, and outside the footprint 3 of satellite 1. By setting a new modified transmission slot, based upon the virtual device position, the modems 4''' will setup a connection 5" with satellite 21 and not with satellite 1, since the modem 4''' are virtually not within footprint 3 of satellite 1 anymore. As a result, satellite 1 has two modems less to serve and satellite 21 has to serve two modems.

It is to be understood that the above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for transmitting data from a population of devices to a relay station travelling with respect to one another, each device having a transmission window and at least one transmission slot resulting from a channel access method, said relay station travelling within said transmission windows, the method comprising:
    broadcasting, via said relay station, an instruction to said population of devices before said data transmission, wherein said instruction is to cause a division of said population of devices into at least two groups of devices, and at least one of said groups of devices has a modified transmission slot for transmitting said data to said relay station; and
    setting, via at least part of said population of devices sets and upon receiving said instruction, the modified transmission slot,
    wherein:
        said channel access method is TDMA and said setting of said modified transmission slot comprises at least one selected from replacing an actual device position for a virtual device position, modifying a transmission slot length, modifying a transmission slot start, modifying a transmission slot end, interrupting a transmission slot, and a combination thereof,
        said relay station has a data receiving capacity, and said modified transmission slot is set for statistically distributing said data transmission of said population of devices for matching said data receiving capacity, and
        said setting of said modified transmission slot is derived from simulating transmission scenarios using a density model of said population of devices.

2. The method of claim 1, wherein said channel access method is selected from the group consisting of FDMA, TDMA, CDMA, OFDMA, SDMA, PDMA, or a combination thereof.

3. The method of claim 1, wherein:
    said broadcasting comprises a broadcast transmission window defining a footprint of said relay station, and
    during said broadcasting, said population of devices is positioned within said footprint.

4. The method of claim 1, wherein:
    at least a number of said devices in said population of devices each initiate a data connection to said relay station, resulting in a congestion that causes failing of at least part of said data connections to said relay station, and
    said failing is caused by a lack of said data receiving capacity to receive said data transmission from said population of devices.

5. The method of claim 1, wherein said setting of said modified transmission slot comprises interrupting a transmission slot.

6. The method of claim 1, wherein at least part of said devices of said population of devices each comprises a device service level defining a time interval for transmitting data.

7. The method of claim 1, furthering comprising broadcasting, via said relay station, a further instruction to said population of devices before said data transmission, wherein upon receiving said further instruction, at least one device of said population of devices sets a second modified transmission slot.

8. The method of claim 1, wherein said relay station is a satellite orbiting a celestial body.

9. The method of claim 1, wherein:
    said population of devices comprise at least one sensor providing measurement data, and a data transmitter for transmitting said data to said relay station remote from said population of devices, and
    said data comprises said measurement data.

10. The method of claim 1, wherein said population of devices are to wait for a next or another, similar relay station to pass the transmission window, or when they receive a broadcast from another, similar relay station.

11. A system, comprising:
    a relay station; and
    a population of devices for transmitting data to at least one relay station, said relay station and said population of devices travelling with respect to one another,
    wherein:
    each of said population of devices has a transmission window and at least one transmission slot resulting from a channel access method for transmitting said data to said relay station,
    said relay station is adapted for broadcasting an instruction to said population of devices when it travels within said transmission windows and before said data transmission, said instruction to cause a division of said population of devices into at least two groups of devices, and at least one of said groups of devices has a modified transmission slot for transmitting said data to said relay station,
    said devices of said population of devices are adapted for setting the modified transmission slot in response to said instruction,
    said channel access method is TDMA and said setting of said modified transmission slot comprises at least one selected from replacing an actual device position for a virtual device position, modifying a transmission slot length, modifying a transmission slot start, modifying a transmission slot end, interrupting a transmission slot, and a combination thereof,
    said relay station has a data receiving capacity, and said modified transmission slot is set for statistically distributing said data transmission of said population of devices for matching said data receiving capacity, and
    said setting of said modified transmission slot is derived from simulating transmission scenarios using a density model of said population of devices.

* * * * *